S. C. HAMLIN.
Combined Clothes-Boilers and Water-Heaters.
No. 149,304. Patented April 7, 1874.
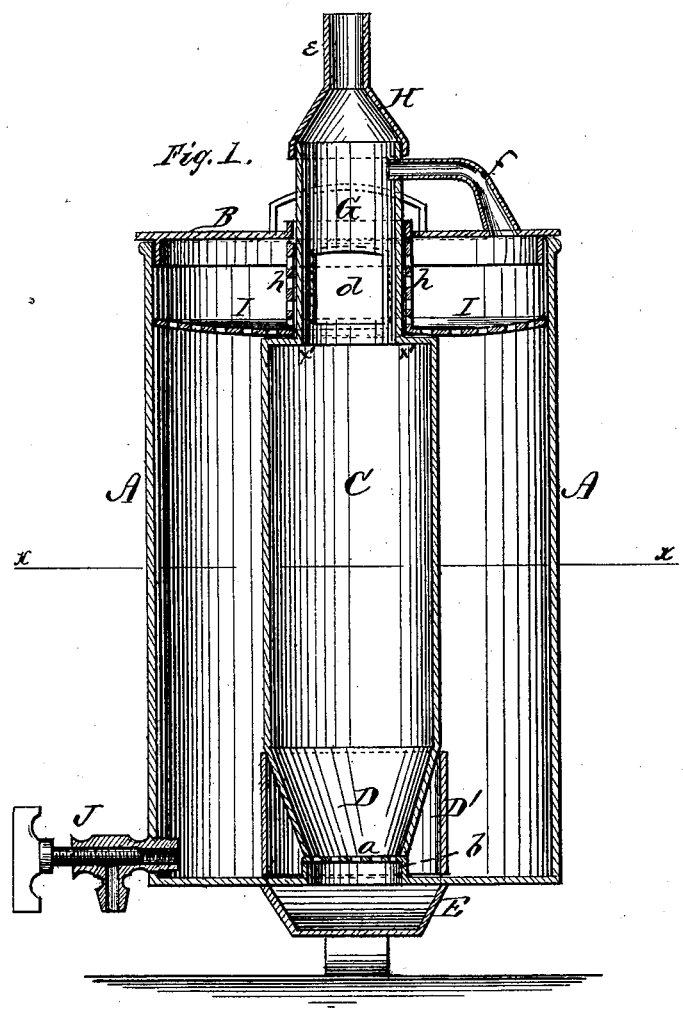
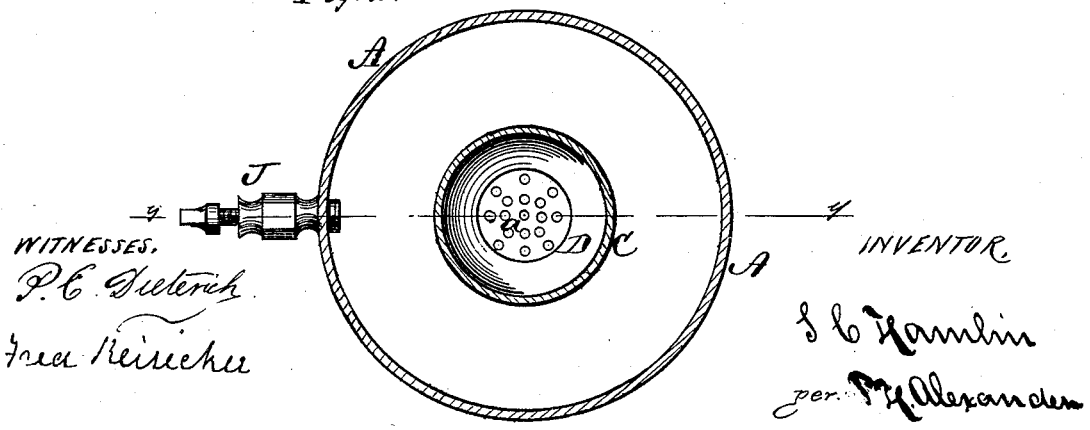

UNITED STATES PATENT OFFICE.

SOLOMON C. HAMLIN, OF YPSILANTI, MICHIGAN.

IMPROVEMENT IN COMBINED CLOTHES-BOILERS AND WATER-HEATERS.

Specification forming part of Letters Patent No. 149,304, dated April 7, 1874; application filed February 13, 1874.

*To all whom it may concern:*

Be it known that I, S. C. HAMLIN, of Ypsilanti, in the county of Washtenaw and State of Michigan, have invented certain new and useful Improvements in Combined Clothes-Boiler and Water-Heater; and I do hereby declare that the following is a full, clear, and exact description thereof, reference being had to the accompanying drawings and to the letters of reference marked thereon, which form part of this specification.

The nature of my invention consists in the construction and arrangement of a combined clothes-boiler and water-heater, as will be hereinafter more fully set forth.

In order to enable others skilled in the art to which my invention appertains to make and use the same, I will now proceed to describe its construction and operation, referring to the annexed drawing, in which—

Figure 1 is a longitudinal vertical section of my combined clothes-boiler and water-heater, taken on the line $y\ y$, Fig. 2. Fig. 2 is a horizontal section of the same on the line $x\ x$, Fig. 1.

A represents a cylindrical vessel, of any suitable dimensions, provided with a tight-fitting lid or cover, B, and supported upon suitable feet. In the center of the vessel A is a cylindrical heater, C, the lower end of which is contracted and forms the fire-pot D, resting upon a grate, $a$. This grate rests upon a circular flange, $b$, which projects upward from a circular aperture in the center of the bottom of the vessel A, and under the same is an ash-box, E, through which draft is supplied to the fire in the fire-pot D. Surrounding this fire-pot is a jacket, D′, of about the same diameter as the heater C, and attached thereto, which prevents the water in the vessel A from coming in direct contact with the fire-pot. The upper end of the heater C has an offset at $x$, a suitable distance below the top of the vessel or boiler A, and from said offset rises the feed-tube G through the lid B, which feed-tube is provided with a door, $d$, for the admission of fuel. Upon the top of the feed-tube G is a conical cap, H, with tube $e$ for the exit of the smoke, and upon said tube more pipe may be added, if necessary. $f$ represents a pipe leading from the lid B into the feed-pipe G, for the escape of the steam from the boiler. Around the feed-pipe G, within the boiler, is placed a perforated sleeve or collar, $h$, at the lower end of which is formed or attached a concave perforated diaphragm, I, resting upon the shoulder $x'$, and extending to the circumference of the boiler. This collar and diaphragm are used only when boiling or steaming clothes, which then are supported upon said perforated diaphragm. Near the bottom, in one side of the boiler A, is an ordinary faucet, J, to draw off the hot water.

This boiler and heater may be placed anywhere without danger, and is a great saving in fuel, and also in time of heating water.

I am aware that none of the elements which go to form my improved water-heater and clothes-boiler are in themselves new, and, therefore, shall lay no claim to them, except when used in the combination now to be stated.

Having thus fully described my invention, what I claim as new, and desire to secure by Letters Patent, is—

The heater C, constructed with the offset $x'$ and feed-pipe G, in combination with the perforated diaphragm I, for forming a suitable chamber in which the clothes may be either steamed or boiled.

In testimony that I claim the foregoing as my own I affix my signature in presence of two witnesses.

SOLOMON C. HAMLIN.

Witnesses:
 ALEX. TURNER,
 CHARLES H. CRANE.